(12) United States Patent
Raff (10) Patent No.: US 11,348,364 B2
(45) Date of Patent: May 31, 2022

(54) METHOD AND SYSTEM FOR NEURAL FINGERPRINT ENHANCEMENT FOR FINGERPRINT RECOGNITION

(71) Applicant: Booz Allen Hamilton Inc., McLean, VA (US)

(72) Inventor: Edward Raff, Columbia, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 69 days.

(21) Appl. No.: 16/719,068

(22) Filed: Dec. 18, 2019

(65) Prior Publication Data

US 2020/0193117 A1 Jun. 18, 2020

Related U.S. Application Data

(60) Provisional application No. 62/781,528, filed on Dec. 18, 2018.

(51) Int. Cl.
*G06V 40/00* (2022.01)
*G06V 40/12* (2022.01)
*G06N 3/04* (2006.01)
*G06N 3/08* (2006.01)

(52) U.S. Cl.
CPC ....... *G06V 40/1376* (2022.01); *G06N 3/0454* (2013.01); *G06N 3/0481* (2013.01); *G06N 3/088* (2013.01); *G06V 40/1347* (2022.01); *G06V 40/1353* (2022.01)

(58) Field of Classification Search
CPC .............. G06K 9/001; G06K 9/00067; G06K 9/00073; G06N 3/0454; G06N 3/0481; G06N 3/088
See application file for complete search history.

(56) References Cited

U.S. PATENT DOCUMENTS

| 2001/0031075 A1* | 10/2001 | Fujii .................. G06K 9/00006 382/125 |
| 2008/0253626 A1* | 10/2008 | Shuckers ........... G06K 9/00107 382/125 |
| 2018/0165508 A1* | 6/2018 | Othman .................... G06K 9/42 |

(Continued)

FOREIGN PATENT DOCUMENTS

EP 3296922 B1 * 12/2019 ......... G06K 9/00013

OTHER PUBLICATIONS

Li et al Deep convolutional neural network for latent fingerprint enhancement, Signal Processing: Image Communication 60, 52-63 (Year: 2018).*

(Continued)

*Primary Examiner* — Ping Y Hsieh
*Assistant Examiner* — Xiao Liu
(74) *Attorney, Agent, or Firm* — Buchanan Ingersoll & Rooney PC (57) ABSTRACT

Biometrics fingerprint matching has been done with a heavily hand-tuned and designed process of classical computer vision techniques for several decades. This approach has led to accurate solutions for solving crimes today and, as such, little effort has been devoted to using deep learning in this domain. Exemplary embodiments disclosed herein leverage synthetic data generators to train a neural fingerprint enhancer to improve matching accuracy on real fingerprint images.

19 Claims, 7 Drawing Sheets

(56) References Cited

U.S. PATENT DOCUMENTS

2018/0260956 A1* 9/2018 Huang ............... B60W 30/10
2020/0012889 A1* 1/2020 Gupta ............... G06K 9/6245

OTHER PUBLICATIONS

Santurkar et al How does batch normalization help optimization, arXiv:1805.11604v1 29 May (Year: 2018).*
Synthetic data—Wikipedia, https://en.wikipedia.org/wiki/Synthetic_data (Year: 2021).*
D. Molchanov, et al., "Variational Dropout Sparsifies Deep Neural Networks", International Conference on Machine Learning (ICML), 2018. (10 pages).
V. Nair, et al., "Rectified Linear Units Improve Restricted Boltzmann Machines", Department of Computer Science, University of Toronto. (8 pages).
D. Nguyen, et al., "Robust Minutiae Extractor: Integrating Deep Networks and Fingerprint Domain Knowledge", Michigan State University, 2017. (8 pages).
R. Nogueira, et al., "Evaluating software-based fingerprint liveness detection using Convolutional Networks and Local Binary Patterns", Department of Conliol and Automation (DCA), University of Campinas (UNICAMP). (8 pages).
M. Olsen, et al., "Self-Organizing Maps for Fingerprint Image Quality Assessment", Computer Vision Foundation (CVF), IEEE Xplore, pp. 138-145.
D. Peralta, et al., "A Survey on Fingerprint Minutiae-based Local Matching for Verification and Identification: Taxonomy and Experimental Evaluation", Information Sciences, 2015, vol. 315, pp. 67-87.
N. Ratha, et al., "Adaptive Flow Orientation-Based Feature Extraction in Fingerprint Images", Pattern Recognition, 1995, vol. 28, No. 11, pp. 1657-1672.
A. Ross, et al., "A Hybrid Fingerprint Matcher", Pattern Recognition, 2003, vol. 36, pp. 1661-1673.
M. Sahasrabudhe, et al., "Fingerprint Enhancement Using Unsupervised Hierachical Feature Learning", Centre for Visual Information Technology, IIIT-Hyderabad, Dec. 14-18, 2015. (8 pages).
S.N. Sarbadhikari, et al., "Noisy Fingerprints Classification with Directional FFI Based Features Using MLP", Neural Computing & Applications, 1998, vol. 7, pp. 180-191.
A. Shrivastava, et al., "Learning from Simulated and Unsupervised Images Through Adversarial Training", Computer Vision Foundation (CVF), IEEE Xplore, pp. 2107-2116.
K. Sundararajan, et al., "Deep Learning for Biometrics: A Survey", ACM Computing Surveys, May 2018, vol. 51, No. 3, Article 65. (34 pages).
Tabassi, "Development of NFIQ 2.0", Evaluation of Potential Image Features for Quality Assessment, Version 0.5, NIST. (65 pages).
J. Tompson, et al., "Accelerating Eulerian Fluid Simulation With Convolutional Networks", Proceedings of the 34th International Conference on Machine Learning, 2017. (10 pages).
C. Wang, et al., "A DCNN Based Fingerprint Liveness Detection Algorithm with Voting Strategy", School of Computer Science, Sichuan University, 2015, pp. 241-249.
F. Wilcoxon, "Individual Comparisons by Ranking Methods", Biometrics Bulletin, International Biometric Society, Dec. 1945, vol. 1, No. 6, pp. 80-83.
L. Yong-Xia, et al., "A New Detection Method of Singular Points of Fingerprints Based on Neural Network", IEEE, 2010, pp. 301-305.
F. Yu, et al., "Multi-Scale Context Aggregation By Dilated Convolutions", ICLR, 2016, pp. 1-13.
M. Zeiler, et al., "Deconvolutional Networks", Dept. of Computer Science, Courant Institute, New York University, 2010. (8 pages).
A. Benavoli, et al., "Should We Really Use Post-Hoc Tests Based on Mean-Ranks?", Journal of Machine Learning Research, 2016, vol. 17, pp. 1-10.
R. Cappelli, et al., "Fingerprint Image Reconstruction from Standard Templates", IEEE Transactions on Pattern Analysis and Machine Intelligence, Sep. 2007, vol. 29, No. 9, pp. 1489-1503.
S. Chikkerur, et al., "Fingerprint Enchancement Using STFT Analysis", Pattern Recognition, 2007, vol. 40, pp. 198-211.
J. Demšr, "Statistical Comparisons of Classifiers Over Multiple Data Sets", Journal of Machine Learning Research, 2006, vol. 7, pp. 1-30.
S. Ioffe, et al., "Batch Normalization: Accelerating Deep Network Training by Reducing Internal Covariate Shift", Proceedings of the 32nd International Conference on Machine Learning, 2015, vol. 37. (9 pages).
A. Jain, et al., "On-line Fingerprint Verification", Pattern Recognition and Image Processing Laboratory, Nov. 26, 1996, pp. 1-36.
D. Lin, et al., "Fixed Point Quantization of Deep Convolutional Networks", Proceedings of the 33rd International Conference on Machine Learning, 2016, vol. 48. (10 pages).
L. Jiang, et al., "A Direct Fingerprint Minutiae Extraction Approach Based on Convolutional Neural Networks", IJCNN, 2016, pp. 571-578.
D. Maio, et al., "FVC2002: Second Fingerprint Verification Competition", Biometric System Lab—DEIS, University of Bologna. (4 pages).
D. Maio, et al., "FVC2000: Fingerprint Verification Competition", IEEE Transactions on Pattern Analysis and Machine Intelligence, Mar. 2002, vol. 24, No. 3, pp. 402-412.
D. Maio, et al., "FVC2004: Third Fingerprint Verification Competition", ResearchGate, Jan. 2004, Conference Paper in Lecture Notes in Computer Science. (9 pages).
L. Darlow, et al., "Fingerprint Minutiae Extraction Using Deep Learning", IEEE International Joint Conference on Biometrics (IJCB), 2017, pp. 22-30.
R. Vazăn, "SourceAFIS", URL:https://sourceafis.machinezoon.com, 2018. (3 pages).
FingerJetFX OSE, 2011. URL:https://github.com/FingerJetFXOSE/FingerJetFXOSE. (3 pages).
ISO/IEC 19794-2:2011. Technical report, International Organization for Standardization, 2011, p. 93.

* cited by examiner

METHOD AND SYSTEM FOR NEURAL FINGERPRINT ENHANCEMENT FOR FINGERPRINT RECOGNITION

FIELD

Methods and systems of neural fingerprint enhancement for fingerprint recognition are disclosed.

BACKGROUND INFORMATION

Known techniques are available for addressing the problem of fingerprint matching and recognition. Two decades of classical image and signal processing techniques have been applied for fingerprint matching with considerable success. See, for example, N. K. Ratha, S. Chen, and A. K. Jain, Adaptive flow orientation-based feature extraction in fingerprint images, Pattern Recognition, 28(11):1657-1672, November 1995. ISSN: 00313203; and N. Ratha, K. Karu, Shaoyun Chen, and A. Jain, A realtime matching system for large fingerprint databases, IEEE Transactions on Pattern Analysis and Machine Intelligence, 18(8):799-813, 1996, ISSN: 01628828. [23, 24].

By 2006, before any resurgence of neural networks in the machine learning community, known fingerprint matching systems where already obtaining low error rates on all but the most challenging examples. See, for example, R. Cappelli, D. Maio, A. Lumini, and D. Maltoni, fingerprint image reconstruction from standard templates, Pattern Analysis and Machine Intelligence, IEEE Transactions on, 29(9): 1489-1503, 2007 [3] and became integral to, for example, the criminal investigation process.

Known fingerprint matching and recognition is based on minutiae extraction and matching. See, for example D. Peralta, M. Galar, I. Triguero, D. Paternain, S. Garcia, E. Barrenechea, J. M. Benitez, H. Bustince, and F. Herrera, A survey on fingerprint minutiae based local matching for verification and identification: Taxonomy and experimental evaluation, Information Sciences, 315:67-87, September 2015. ISSN: 0020-0255 [22]. Key minutiae are locations where each ridge of a print either ends or combines with another ridge. These minutiae are, for example, characterized by their relative location to one another, type, and orientation. These can be represented as a graph, and graph-matching is used to compare fingerprint minutiae. See, for example, A. Jain, L. Hong, and R. Bolle, On-line fingerprint verification, IEEE transactions on pattern analysis and machine intelligence, 19(4):302-314, 1997 [11].

At a high level, the standard process for minutiae extraction uses the following steps: 1) Pre-process the image to counter various forms of noise and quality issues; 2) Estimate information about the orientation of the ridges in a fingerprint; 3) Apply a process to identify minutiae, and use pre-processed image and orientation data to characterize minutiae; 4) Post-process minutiae using prior learnings to remove spurious, incorrect, and unreliable identifications.

Known fingerprint matching systems have been deemed acceptable, and as such, neural networks have not been applied to the problem of enhancing fingerprint matching results. Neural networks have been used to model problems with computer generated simulations that are currently at or near the point of fully specifying the problem space. See, for example, A. Shrivastava, T. Pfister, O. Tuzel, J. Susskind, W. Wang, and R. Webb, Learning from Simulated and Unsupervised Images through Adversarial Training, 2017 IEEE Conference on Computer Vision and Pattern Recognition (CVPR), pages 2242-2251, IEEE, July 2017, ISBN: 978-1-5386-0457-1 [28] wherein Generative Adversarial Networks (GANs) are disclosed to increase realism of rendered images of eyes to train a better eye tracking system.

By generating the data themselves, these systems can know exact ground truth labels. See, for example, J. Tompson, K. Schlachter, P. Sprechmann, and K. Perlin, Accelerating Eulerian Fluid Simulation With Convolutional Networks, D. Precup and Y. W. Teh, editors, Proceedings of the 34th International Conference on Machine Learning, volume 70 of Proceedings of Machine Learning Research, pages 3424-3433, International Convention Centre, Sydney, Australia. PMLR, 2017 [31] wherein Cellular Neural Networks (CNNs) are disclosed to reproduce the output of classical 2D and 3D fluid simulations. The disclosed network is described as producing predictions fast enough for realtime simulations, where the classical methods are too slow for such scenarios.

Such techniques have not been optimally applied to fingerprint processing. A document by M. Sahasrabudhe and A. M. Namboodiri, Fingerprint Enhancement Using Unsupervised Hierarchical Feature Learning, Proceedings of the 2014 Indian Conference on Computer Vision Graphics and Image Processing, ICVGIP '14, 2:1-2:8, New York, N.Y., USA. ACM, 2014. ISBN: 978-1-4503-3061-9 [26], discloses training a convolution Restricted Boltzman Machine (RBM) to enhance fingerprint images. Training is performed in an unsupervised fashion on a handpicked subset of higher quality fingerprint images from three different databases. This approach did not generalize to new fingerprints, and most analysis was restricted to the same three datasets that were used for training.

Several works have looked at using multiple neural networks to perform minutiae extraction, combined with additional hand tuned techniques to post-process results by still using classical enhancement techniques like gabor filters. See, for example, L. N. Darlow and B. Rosman, Fingerprint minutiae extraction using deep learning, 2017 IEEE International Joint Conference on Biometrics (IJCB), pages 22-30, IEEE, October 2017, ISBN: 978-1-5386-1124-1; Lu Jiang, Tong Zhao, Chaochao Bai, A. Yong, and Min Wu, A direct fingerprint minutiae extraction approach based on convolutional neural networks, 2016 International Joint Conference on Neural Networks (IJCNN), pages 571-578, IEEE, July 2016, ISBN: 978-1-5090-0620-5; and D. L. Nguyen, K. Cao, and A. K. Jain. Robust Minutiae Extractor: Integrating Deep Networks and Fingerprint Domain Knowledge, The 11th International Conference on Biometrics, 2018, 2018 [6, 13, 19].

These documents do not address evaluating an ability to perform accurate matching with these minutia, which is the ultimate end goal. Deep Learning is a known technique for biometric tasks such as face, iris, handwritten signature, and gait recognition. See, for example K. Sundararajan and D. L. Woodard. Deep Learning for Biometrics: A Survey. ACM Comput. Surv., 51(3):65:1-65:34, May 2018. ISSN: 0360-0300 [29].

Other known works use neural networks in the fingerprint domain to tackle specific sub-goals in larger hard-coded pipelines. For example, M. A. Olsen, E. Tabassi, A. Makarov, and C. Busch, Self-Organizing Maps for Fingerprint Image Quality Assessment, 2013 IEEE Conference on Computer Vision and Pattern Recognition Workshops: 138-145,2013, ISSN: 21607508 [21] discloses using Self Organizing Maps to evaluate the quality of sub-portions of an image.

A document by L. Yong-xia, Q. Jin, and X. Rui, A new detection method of singular points of fingerprints based on neural network, Computer Science and Information Technology (ICCSIT), 2010 3rd IEEE International Conference on, volume 1, pages 301-305, July 2010 [36] discloses using neural networks to simply find the core of a finger print.

A document by S. N. Sarbadhikari, J. Basak, S. K. Pal, and M. K. Kundu, Noisy fingerprints classification with directional FFT based features using MLP. Neural Computing & Applications, 7(2):180-191, 1998, ISSN: 0941-0643 [27] discloses using a simple fully connected network atop FFT based features to classify prints into types (left & right loop, whorl, twin loop, and plain arch).

Work in fingerprint liveness detection (i.e., is the fingerprint from a real finger) has followed a similar path to current techniques of still using considerable hand-designed computer vision pre-processing See, R. F. Nogueira, R. D. A. Lotufo, and R. C. Machado, Evaluating software-based fingerprint liveness detection using Convolutional Networks and Local Binary Patterns, Proceedings of the IEEE Workshop on Biometric Measurements and Systems for Security and Medical Applications (BIOMS), pages 22-29, Rome, Italy, 2014. ISBN: 9781479951765 [20] and C. Wang, K. Li, Z. Wu, and Q. Zhao, A DCNN Based Fingerprint Liveness Detection Algorithm with Voting Strategy, J. Yang, J. Yang, Z. Sun, S. Shan, W. Zheng, and J. Feng, editors, Biometric Recognition, pages 241-249. 2015. ISBN: 978-3-319-25417-3 [33]; C. I. Watson, M. D. Garris, E. Tabassi, C. L. Wilson, R. M. McCabe, S. Janet, and K. Ki, User's Guide to NIST Biometric Image Software (NBIS), Technical report, National Institute of Standards and Technology, 2007 [20, 33, 34].

SUMMARY

Methods are disclosed of neural fingerprint enhancement for fingerprint recognition. An exemplary method includes enhancing a received fingerprint image with a neutral network trained to learn an inverse of a noising process used to convert ridge patterns of an input fingerprint image into an enhanced fingerprint image; performing a minutia extraction on the enhanced fingerprint image to detect minutia locations and orientations as extracted minutia characteristics of the enhanced fingerprint image; matching the extracted minutia characteristics with stored minutia characteristics to identify a fingerprint match; and outputting the fingerprint match.

Systems are also disclosed of neural fingerprint enhancement for fingerprint recognition. An exemplary system includes a denoising convolutional auto-encoder module trained by a neural network to learn an inverse of a noising process that converts ridge patterns of an input image fingerprint into an enhanced fingerprint image; a minutia extraction model configured for detecting minutia locations and orientation as extracted minutia characteristics of an enhanced fingerprint image; a fingerprint matching module for matching the extracted minutia characteristics with stored minutia characteristics to identify a fingerprint match; and an output module for outputting the fingerprint match.

BRIEF DESCRIPTION OF THE DRAWINGS

Further advantages and features follow from the subsequent description of exemplary variant embodiments with reference to the diagrammatic drawings, which are depicted not true to scale, and in which.

DETAILED DESCRIPTION

Techniques for biometrics fingerprint matching described in the background section utilize a heavily hand-tuned and designed process of classical computer vision techniques. To address these issues in the known techniques, the present disclosure provides a fingerprinting process via optimal training of neural networks. By leveraging synthetic data generators a neural fingerprint enhancer can be trained so that it improves matching accuracy on real fingerprint images.

Figure 1:
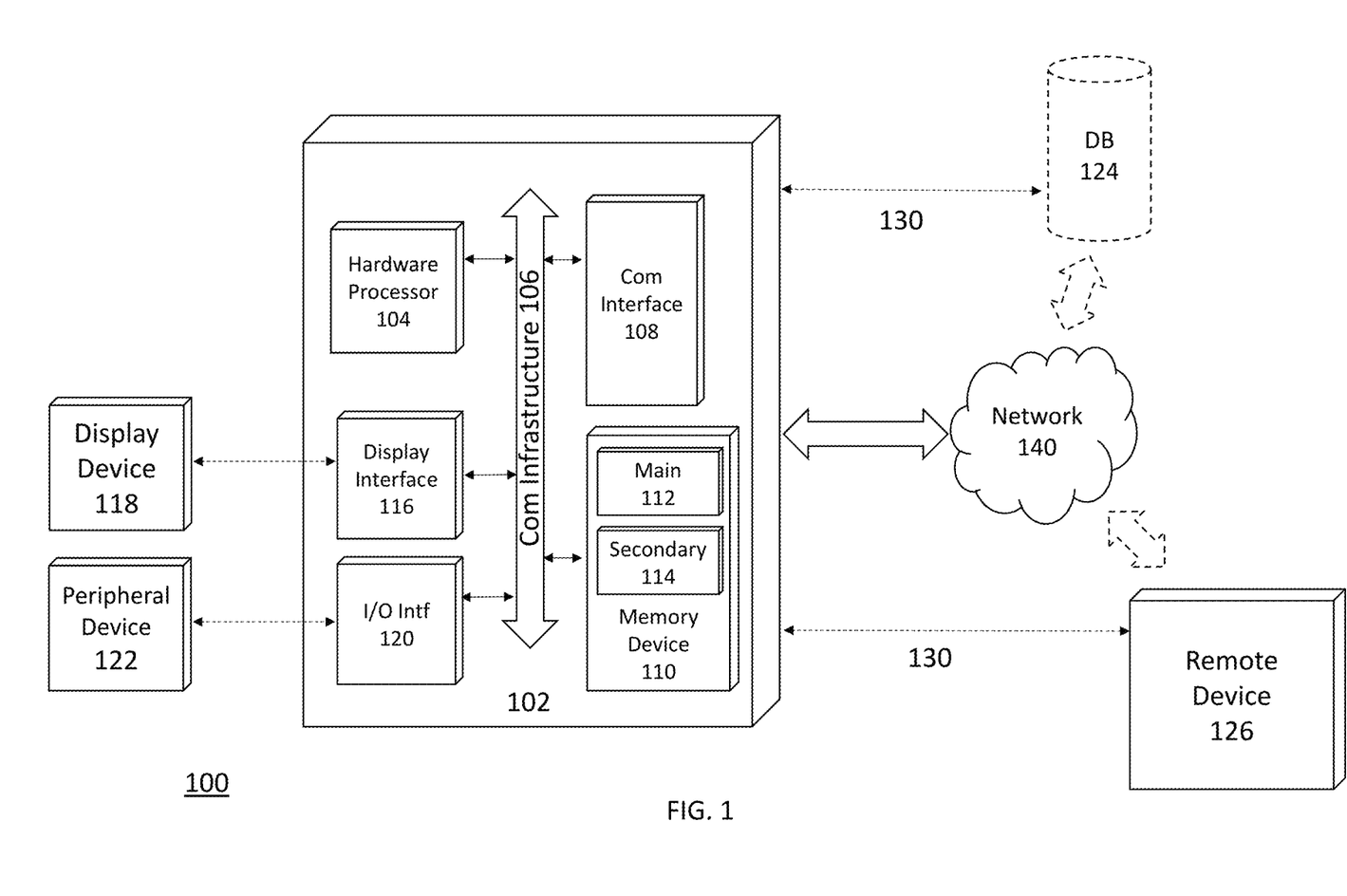
FIG. 1 illustrates an exemplary system for neural fingerprint enhancement for fingerprint recognition in accordance with an exemplary embodiment of the present disclosure.

FIG. 1 illustrates an exemplary system for neural fingerprint enhancement (NFE) for fingerprint recognition in accordance with an exemplary embodiment of the present disclosure.

As shown in FIG. 1, the system 100 includes a controller 102 configured to perform fingerprint enhancement according to the exemplary embodiments and techniques described herein. The controller 102 can include a hardware processor 104, a communication infrastructure 106, a communication interface 108, a memory device 110, a display interface 112, and an Input/Output (I/O) interface 116.

The hardware processor 104 can be encoded with program code or software for executing a denoising neural network architecture. According to an exemplary embodiment the hardware processor can be configured to include a denoising convolutional auto-encoder module, a minutia extraction model, and a fingerprint matching model. The denoising convolutional auto-encoder module can be configured to convert ridge patterns of an input image fingerprint into an enhanced fingerprint image. The minutia extraction model is configured for detecting minutia locations and orientation as extracted minutia characteristics of an enhanced fingerprint image. The fingerprint matching module for matching the extracted minutia characteristics with stored minutia characteristics to identify a fingerprint match. The network can be a relatively shallow architecture allowing for fast execution and handling variable image input sizes. Training can be done on synthetically generated fingerprints, and evaluation can occur on both real and synthetic prints.

The hardware processor 104 may be a single hardware processor, a plurality of hardware processors, or combinations thereof. In addition, the hardware processor 104 devices may have one or more processor "cores." The hardware processor 104 may be special purpose or general purpose hardware processor devices. According to an exemplary embodiment, the hardware processor 104 can include an NVIDIA Titan X Graphical Processing Unit in combination with one or more other processors for rendering enhanced fingerprint images as described herein. The hardware processor 104 can be connected to a communications infrastructure 106 including a bus, message queue, network, or multi-core message-passing scheme, for communicating with other components of the controller 102.

The communications interface 108 can be a combination of software and hardware components configured to allow software and data to be transferred between the controller 102 and external or remote devices 118, 122, 126. An exemplary communications interface 108 may include a modem, a network interface (e.g., an Ethernet card), a communications port, a PCMCIA slot and card, etc. Software and data transferred via the communications interface 108 may be in the form of signals, which may be electronic, electromagnetic, optical, or other signals as will be apparent to persons having skill in the relevant art. The signals may travel via a communications path, which may be configured to carry the signals and may be implemented using wire, cable, fiber optic cable, a phone line, a cellular phone link, a radio frequency link, or any other suitable communication medium as desired.

The memory device 110 can be configured to store program code for performing the specialized functions for fingerprint enhancement and/or data values or images resulting from or used in performing the specialized functions. The memory device 110 can include one more volatile and/or non-volatile devices or semiconductor circuits (e.g., DRAMs, etc.), which encompass a non-transitory computer-readable medium. According to an exemplary embodiment, the memory device 110 can include a main memory 112 (e.g., random access memory, read-only memory, etc.) and may also include a secondary memory 114. The secondary memory 114 may include a hard disk drive and a removable storage drive, such as a floppy disk drive, a magnetic tape drive, an optical disk drive, a flash memory, etc.

The removable storage drive may read from and/or write to the removable storage unit in a well-known manner. The removable storage unit may include a removable storage media that may be read by and written to by the removable storage drive. For example, if the removable storage drive is a floppy disk drive or universal serial bus port, the removable storage unit may be a floppy disk or portable flash drive, respectively. In one embodiment, the removable storage unit may be non-transitory computer readable recording media.

In some embodiments, the secondary memory 114 may include alternative means for allowing computer programs or other instructions to be loaded into the controller 102, for example, the removable storage unit and an interface. Examples of such means may include a program cartridge and cartridge interface (e.g., as found in video game systems), a removable memory chip (e.g., EEPROM, PROM, etc.) and associated socket, and other removable storage units and interfaces as will be apparent to persons having skill in the relevant art.

The display interface 116 may be a combination of software and hardware components configured to allow data to be formatted and transferred between the controller 102 and a display device 118. Exemplary display interfaces 116 may include high-definition multimedia interface (HDMI), digital visual interface (DVI), video graphics array (VGA), etc. The display device 118 may be any suitable type of display for displaying data transmitted via the display interface 116 of the computer system 600, including a cathode ray tube (CRT) display, liquid crystal display (LCD), light-emitting diode (LED) display, capacitive touch display, thin-film transistor (TFT) display, and any variations or derivations thereof.

The I/O interface 120 can be a combination of software and hardware components configured to allow data to be formatted and transferred between the controller 102 and one or more peripheral devices 122 such as a printer, speaker, external memory device, portable computing device, etc.

Figure 2:
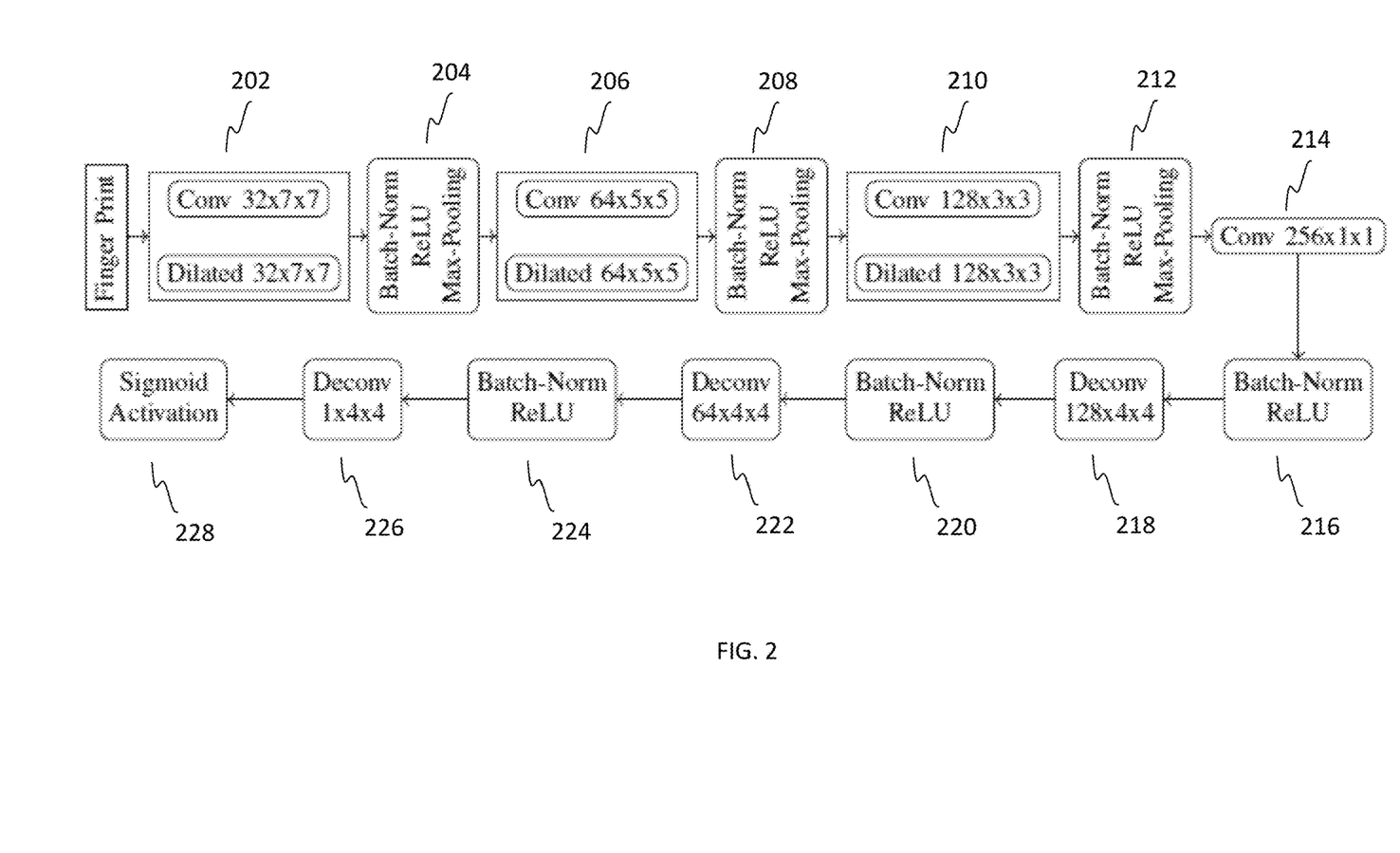
FIG. 2 illustrates a denoising neural network in accordance with an exemplary embodiment of the present disclosure.

FIG. 2 illustrates a denoising neural network in accordance with an exemplary embodiment of the present disclosure.

As shown in FIG. 2, the denoising neural network 200 can be configured as a convolutional network having a plurality of layers. This allows the network to be applied to inputs of any size. This can be important since there is no fixed standard size of fingerprint images. The initial layer and at least three of the subsequent layers in sequence are convolutional layers 202, 206, 210. Each convolutional layer 202, 206, and 210 is followed by a sequence of layers for performing batch normalization, rectified linearization via a rectified linear unit (ReLU), and max-pooling, which plural layers are represented by the single (BRM) blocks 204, 208, 212. Each convolutional layer is evenly split between use of standard and dilated convolutions. This allows an input fingerprint image to be processed in parallel by each of the standard and dilated convolutions. The dilated convolutions can include any number of gaps as desired based on a specified dilation rate (e.g., k=2, 3, 4, etc.). The dilation rate is used to increase the receptive field captured by each feature of the input finger print image, which in turn increases the size of the image for processing. For example, the first convolutional layer 202 includes 64 total filters and is split evenly among standard (32 filters) and diluted (32 filters) convolutions. The second convolutional layer 206 includes 128 total filters that are evenly split to include 64 each of standard and diluted convolutions. The third convolutional layer 210 includes 256 filters, which includes 128 each of standard and diluted convolutions. The mix of dilation and standard filters allows local fine grained details, as well as non-local farther details to be captured. The outputs of the separate standard and diluted convolutions in the first, second, and third convolutional layers 202, 206, 210 are concatenated prior to feeding the processed image features into the associated BRM block 204, 208, 212, respectively.

The output of BRM block 212 is fed to a 1×1 convolutional layer 214 having a specified number of filters. According to an exemplary embodiment, the convolutional layer 214 includes 256 filters to match the number of the third convolutional layer 210 so that the information (e.g., nodal weights) of the first, second, and third convolutional layers 202, 206, 210 can be shared by the nodes in the convolutional layer 214. The output of the 1×1 convolutional layer 214 is fed to a batch normalization layer followed by a ReLU represented by block (BR) 216. The output of BR 216 is fed to a sequence of deconvolutional layers 218, 222, 226 and BR blocks 220, 224 to resize the fingerprint image to its original size. According to an exemplary embodiment, each of the deconvolutional layers is specified as having a 4×4 receptive field with a varying number of filters among each subsequent layer. For example, the deconvolutional layer 218 includes 128 filters, the deconvolutional layer 222 includes 64 filters, and the deconvolutional layer 226 includes 1 filter. The output of the last deconvolutional layer 226 is fed to a sigmoid activation layer 228 to clamp (e.g., set) the nodal values within a value range of 0 to 1.

Figure 3:
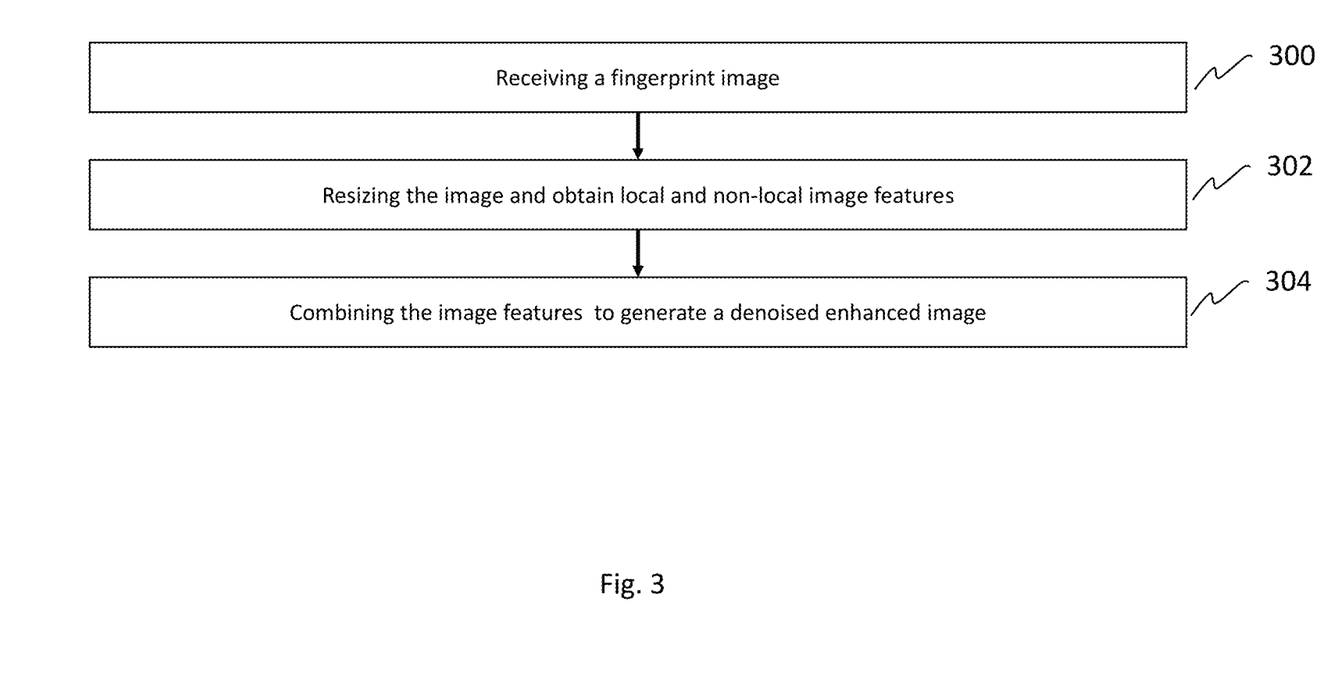
FIG. 3 illustrates an exemplary flowchart of a method for neural fingerprint enhancement in accordance with an exemplary embodiment of the present disclosure.

FIG. 3 illustrates an exemplary flowchart of a method for neural fingerprint enhancement in accordance with an exemplary embodiment of the present disclosure.

As shown in FIG. 3, a fingerprint image is received into the controller 102 via the communication interface 108 (Step 300). The fingerprint image can be received from an external computing device 122 or database 124 over a network connection 120 over via a peer-to-peer communication link 130. The fingerprint image is fed to the hardware processor 104 where the image is resized via convolution layers 202, 206, 210, 214 to obtain the fine-grained details (e.g., features) as well as processed to identify non-local image details of the fingerprint through parallel processing of image using both standard and dilated convolutions, respectively (Step 302). The non-local details are obtained by computing a mean of all pixels in a specified range based on the dilation rate to determine how similar the range of pixels is to a target pixel. Once the details of the image are obtained the image is resized via the deconvolutional layers 218, 222, 226 in which the fine-grained details and the non-local details are combined to generate a denoised enhanced image (Step 304).

Exemplary embodiments use a neural network to learn the inverse of the noising process that converts ground-truth ridge patterns into a noisy and realistic fingerprint. According to an exemplary embodiment of the present disclosure, the learned denoising function can be applied as a neural fingerprint enhancer (NFE) technique before a minutiae extraction process. For example, techniques associated with Gabor filters in, for example, A. Ross, A. Jain, and J. Reisman, A hybrid fingerprint matcher, Pattern Recognition, 36(7):1661-1673, 2003. ISSN: 00313203 [25] and 2-D Fourier Transforms; and S. Chikkerur, A. N. Cartwright, and V. Govindaraju, Fingerprint enhancement using STFT analysis, Pattern Recognition, 40(1):198-211, January 2007, ISSN: 0031-3203 [5] can be employed, the contents of which are hereby incorporated by reference in their entireties.

Figure 4:
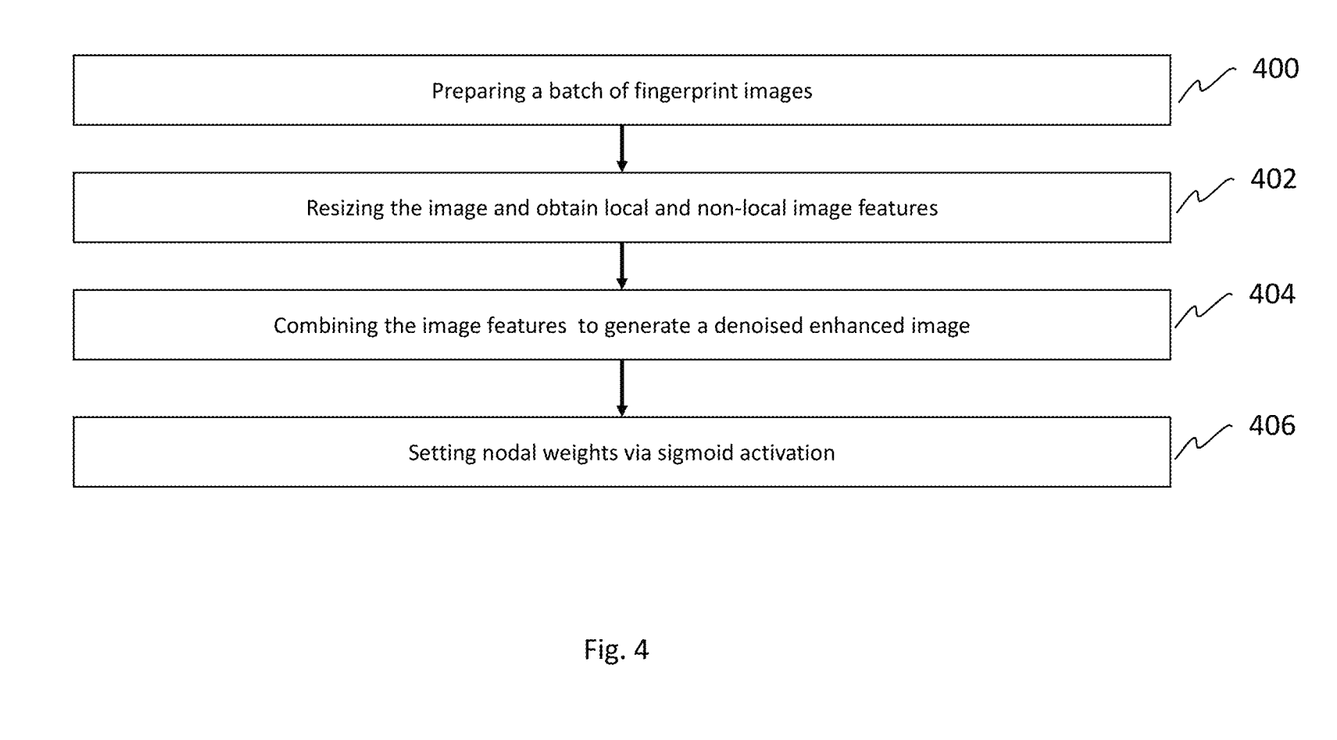
FIG. 4 illustrates an exemplary flowchart of a method for training the controller for neural fingerprint enhancement in accordance with an exemplary embodiment of the present disclosure.

FIG. 4 illustrates an exemplary flowchart of a method for training the controller for neural fingerprint enhancement in accordance with an exemplary embodiment of the present disclosure. The objective of the training process is to input a raw image into the controller 202 and have it learn to produce the ridge pattern of a ground-truth image (i.e., real world image) from the raw image. The predicted ridge pattern can then be used as an enhanced image with known systems and techniques providing minutiae matching and extraction.

As shown in FIG. 4, a batch of fingerprint images is prepared and input to the first convolutional layer 202 (Step 400). According to an exemplary embodiment, the batch can include 600,000 (or more or less) image pairs of synthetic fingerprint images. The image pairs can be generated using known synthetic fingerprint generator technology, such as Synthetic Fingerprint Generator (SFinGe) version 4.1. The fingerprint images can be generated according to various combination of a plurality of parameters. The parameters can define the image background and distribution, horizontal and vertical translation of the image, image rotation, and dots per inch (DPI). The background can be set as one of optical or capacitive values. The distribution can be set as "varying quality and perturbations" or "very low quality". The horizontal and vertical translation can be set to a percent range, such as ±5%, and the rotation to an angle range such as ±25°. The DPI can be set to a preferred value according to desired image quality. According to an exemplary embodiment, the DPI can equal to 500. It should be understood that the value of any other parameters can be adjusted as desired. Moreover, it should be apparent to one of skill in the art that other systems and techniques for generating synthetic fingerprints according to varying parameters specific to those systems and techniques can be used for generating the batch of images.

The fingerprint image is fed to the hardware processor 104 where it is resized via convolution layers 202, 206, 210, 214 to obtain the fine-grained details (e.g., standard convolution) as well as processed to identify non-local image details (e.g., dilated convolution) of the fingerprint (Step 402). Once the details of the image are obtained the image is resized via the deconvolution layers 218, 222, 226 in which the fine-grained details and the non-local details are combined to generate an enhanced image (Step 404). The nodal weights across the plurality of layers of the neural network are set via sigmoid activation 228 to a value range of 0 to 1 (Step 406).

Training the exemplary neural fingerprint enhancer of the controller 102 can be performed according to one or more epochs. The number of epochs can be determined by the number of fingerprints in the batch, the available memory (e.g., random access memory) in the memory device 110, and the time available for completion. For example, the neural fingerprint enhancer of the present disclosure can be trained in six epochs for a batch size of 64 images and 12 GB RAM, where each image is processed (e.g., reading in a fingerprint, applying neural fingerprint enhancement, and saving it back to disk) can average 0.618 seconds per image and a total training time of 17 hours. The training time could be reduced significantly, for example by applying a weight quantization such as that disclosed by D. Lin, S. Talathi, and S. Annapureddy, Fixed Point Quantization of Deep Convolutional Networks, M. F. Balcan and K. Q. Weinberger, editors, Proceedings of The 33rd International Conference on Machine Learning, volume 48 of Proceedings of Machine Learning Research, pages 2849-2858, New York, N.Y., USA. PMLR, 2016 [12] the disclosure of which are hereby incorporated by reference in their entirety, and a pruning as disclosed by D. Molchanov, A. Ashukha, and D. Vetrov. Variational Dropout Sparsifies Deep Neural Networks, International Conference on Machine Learning (ICML), 2017 [17] the disclosure of which are hereby incorporated by reference in their entirety, and integrating matching tools so that the output does not need to be written back to a slower HDD. The HDD overhead causes GPU utilization to average at only 40%. A comparison of the performance of three minutia extraction and matching algorithms on both real and generated test datasets are provided herein.

An exemplary modelling that can be used to train a neural network is that disclosed by R. Cappelli, Synthetic fingerprint generation, Handbook of Fingerprint Recognition: 203-232, 2003; and by R. Cappelli, SFinGe, Encyclopedia of Biometrics, pages 1-9. Springer US, Boston, Mass., 2014, the contents of which are hereby incorporated herein by reference in their entireties [4][2]. The disclosed software can be used in accordance with exemplary embodiments disclosed herein to generate realistic fingerprint images, allowing a user to set and control different properties of the fingerprint such as rotations, noise, damage, and more. Exemplary embodiments disclosed herein can, for example, use software, such as that of Cappelli's software or other similar suitable software, to generate synthetic training data for a denoising convolutional auto-encoder.

Figure 5:
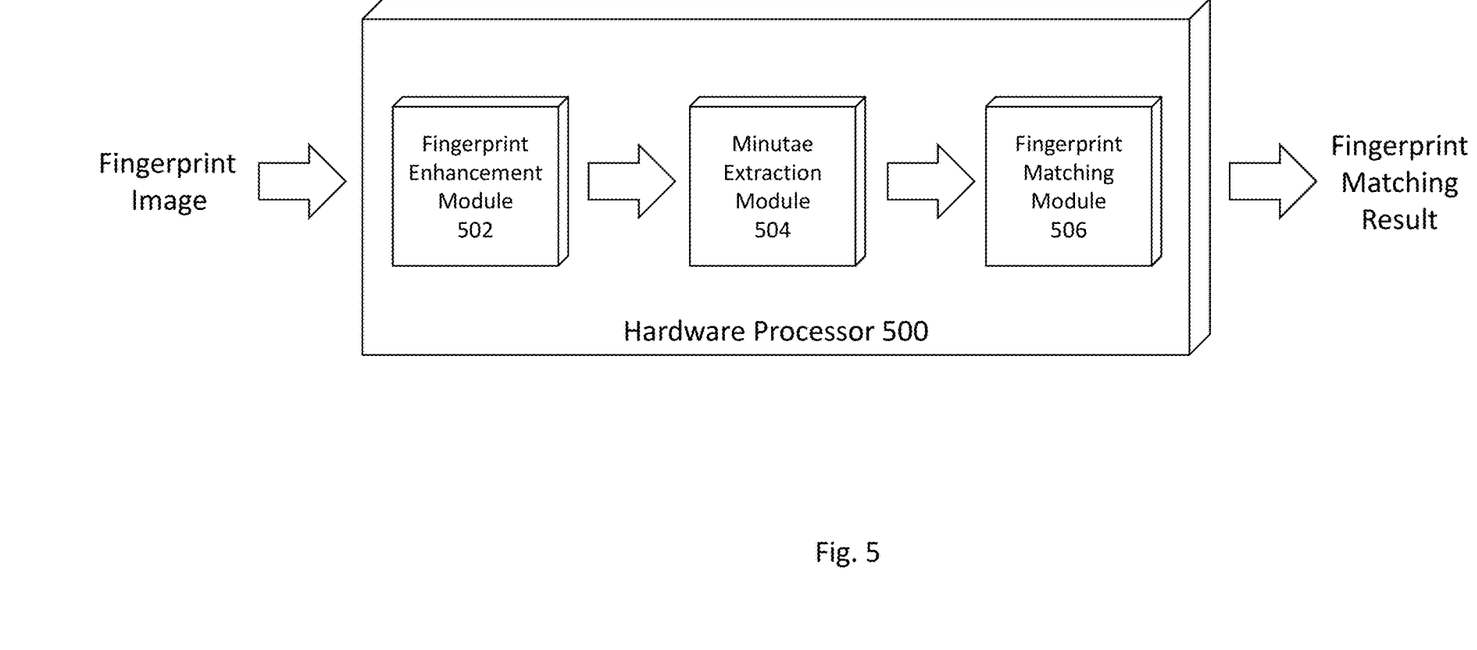
FIG. 5 illustrates a hardware processor encoded with software or program code for enhancing and matching a fingerprint according to an exemplary embodiment of the present disclosure.

Exemplary embodiments of the present disclosure for fingerprint enhancement can be combined with known minutiae extractors and minutiae matchers for use by law enforcement or industry-related agents and/or entities in evaluating fingerprints obtained directly from persons or objects. FIG. 5 illustrates a hardware processor encoded with software or program code for enhancing and matching a fingerprint according to an exemplary embodiment of the present disclosure. The hardware processor 500 can be deployed within the controller 102 of FIG. 1, where the controller 102 is configured for evaluating one or more fingerprint images received from one or more remote devices 126, peripheral devices 122, a storage device or database 124. As shown in FIG. 5, the hardware processor 500 can include a fingerprint enhancement module 502, a minutiae extraction module 504, and a fingerprint matching module 506.

The fingerprint enhancement module 502 can be configured to perform fingerprint enhancement on a fingerprint image as described in FIGS. 2 and 3. For example, the fingerprint enhancement module can be configured to enhance a received fingerprint image with a neutral network trained to learn an inverse of a noising process used to convert ridge patterns of an input fingerprint image into an enhanced fingerprint image.

The minutiae extraction module 504 can be configured to receive the enhanced fingerprint image from the fingerprint enhancement module 502 and perform a minutia extraction on the enhanced fingerprint image to detect minutia locations and orientations as extracted minutia characteristics of the enhanced fingerprint image. The minutiae extraction module 504 can be configured to execute any of known minutiae extraction algorithms such as National Institute of Standards and Technology (NIST) MindTCT, SourceAfis, or FingerJetFX.

The fingerprint matching module 506 can be configured to match the extracted minutia characteristics with stored minutia characteristics to identify a fingerprint match. The fingerprint matching module 506 can be configured to execute any known fingerprint matching algorithm such as BOZORTH3 and SourceAfis. The stored minutia characteristics can be obtained from memory device 110, database 124, or any other external or remote memory device as desired.

It should be apparent to one of skill in the art that any known minutiae extraction algorithm can be used in combination with a fingerprint matching algorithm as desired. For example, according to an exemplary embodiment of the present disclosure the minutiae extraction module 504 can be configured according to the NIST MindTCT algorithm and the fingerprint matching module 506 can be configured according to the BOZORTH3 algorithm. According to another exemplary embodiment of the present disclosure, the minutiae extraction module 504 can be configured according to the FingerJetFX extraction algorithm and the fingerprint matching module 506 can be configured according to the SourceAfis algorithm. According to yet another exemplary embodiment of the present disclosure the minutiae extraction module 504 can be configured according to the NIST MindTCT algorithm and the fingerprint matching module 506 can be configured according to the SourceAfis algorithm. According to another exemplary embodiment of the present disclosure, both the minutiae extraction module 504 and the fingerprint matching module 506 can be configured according to the SourceAfis algorithm. It should be understood that each of the various minutiae extraction and fingerprint matching algorithms have various features and parameters which can be adjusted for specified performance results as desired. Moreover, known individual techniques can be selectively considered in a novel fashion as disclosed herein, whereby learning an image enhancement process can improve results, thus simplifying the need for fine tuning and maintaining complex systems for fingerprint matching.

The NIST MINDTCT and BOZORTH3 extraction algorithms are disclosed for example by C. I. Watson, M. D. Garris, E. Tabassi, C. L. Wilson, R. M. McCabe, S. Janet, and K. Ki. User's Guide to NIST Biometric Image Software (NBIS), Technical report, National Institute of Standards and Technology, 2007 [34] (referred to herein as NIST for short the contents of which are hereby incorporated by reference in their entirety). Despite the age of these tools, they are competitive in terms of matching accuracy as recognized, for example, by D. Peralta, M. Galar, I. Triguero, D. Paternain, S. Garcia, E. Barrenechea, J. M. Benitez, H. Bustince, and F. Herrera, A survey on fingerprint minutiae based local matching for verification and identification, Taxonomy and experimental evaluation. Information Sciences, 315:67-87, September 2015, ISSN: 0020-0255 [22] the contents of which are hereby incorporated by reference in their entirety.

The SourceAfis algorithm is disclosed in R. Važan. SourceAFIS, 2018. URL: https://sourceafis.machinezoo.com/ [32] project, the contents of which are hereby incorporated by reference in their entirety. Because SourceAfis is compatible with ISO/IEC 19794-2 ISO/IEC 19794-2:2011, Technical report, International Organization for Standardization, 2011, page 93 [10], the SourceAfis matching algorithm can be used with a different minutia extractor. DigitalPersona Inc. released FingerJetFX as commercial solution for minutia extraction under an open source license FingerJetFX OSE, 2011, URL: https://github.com/FingerJetFX-OSE/FingerJetFXOSE [8] the contents of which are hereby incorporated by reference in their entirety.

Both the NIST and FingerJetFX extractors can use a 2D block FFT in a manner style as disclosed by S. Chikkerur, A. N. Cartwright, and V. Govindaraju, Fingerprint enhancement using STFT analysis, Pattern Recognition, 40(1):198-211, January 2007, ISSN: 0031-3203 [5] the contents of which are hereby incorporated in their entirety. An exemplary NFE as disclosed herein can provide an improvement over combined FingerJetFX+SourceAfis algorithms and NIST, and improve upon the hand turned classical computer vision approach to fingerprint enhancement. Significant testing has shown FFT and Gabor based processing can deliver similar high performance as disclosed, for example, by E. Tabassi, Development of NFIQ 2.0, Technical report, National Institute of Standards and Technology, 2012 [30] the contents of which are hereby incorporated by reference in their entirety. SourceAfis uses its own custom enhancement and ridge smoothing algorithm developed and refined since 2009.

According to exemplary embodiments disclosed herein, the neural fingerprint enhancement reduces the complexities and ambiguities that other algorithms and software would need to tackle for the majority of fingerprints. Comparing the result with the ground truth, the majority of minutiae is correctly formed. Most exceptions occur near the edge of the fingerprint, or in the particularly low-quality area near the delta of the fingerprint.

Figure 6:
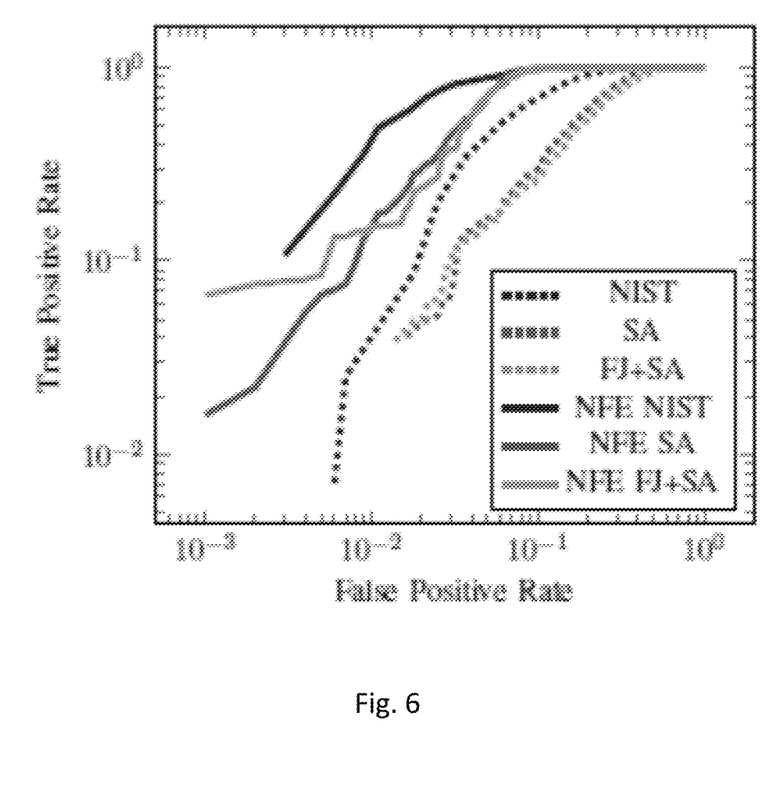
FIG. 6 illustrates an exemplary graph showing a receiver operating characteristic curve for known feature extraction and matching algorithms with and without neural fingerprint enhancement in accordance with an exemplary embodiment of the present disclosure.

FIG. 6 illustrates an exemplary graph showing a receiver operating characteristic curve for known feature extraction and matching algorithms with and without NFE. The Area Under the ROC curve (AUC) is the sum of area under the trade-off between false positive rate and true positive rate, and can be interpreted as the quality of the ranking produced by each method. While the AUC indicates uniform improvement by neural fingerprint enhancement (NFE) on this corpus, fingerprint matching often takes into account differing false positive rates. As shown in FIG. 6, not only does the ROC curve for each algorithm with NFE dominate the curve for the algorithm without NFE, all the curves for the NFE-augmented algorithms dominate all the curves for algorithms that were not NFE-augmented.

The fingerprint matching result generated by the fingerprint matching module 506 can be output for storage in memory device 110, output to display device 118 via the display interface 116, output to a peripheral device 122 via the I/O interface 120, output to a database 124 over the network 140 via the communication interface 108 or via a peer-to-peer communication link 130, output to the network 140 via the communication interface 108, or output for transmission to a remote device 126 over the network 140 via the communication interface 108, or via a peer-to-peer communication link 130.

Figure 7:
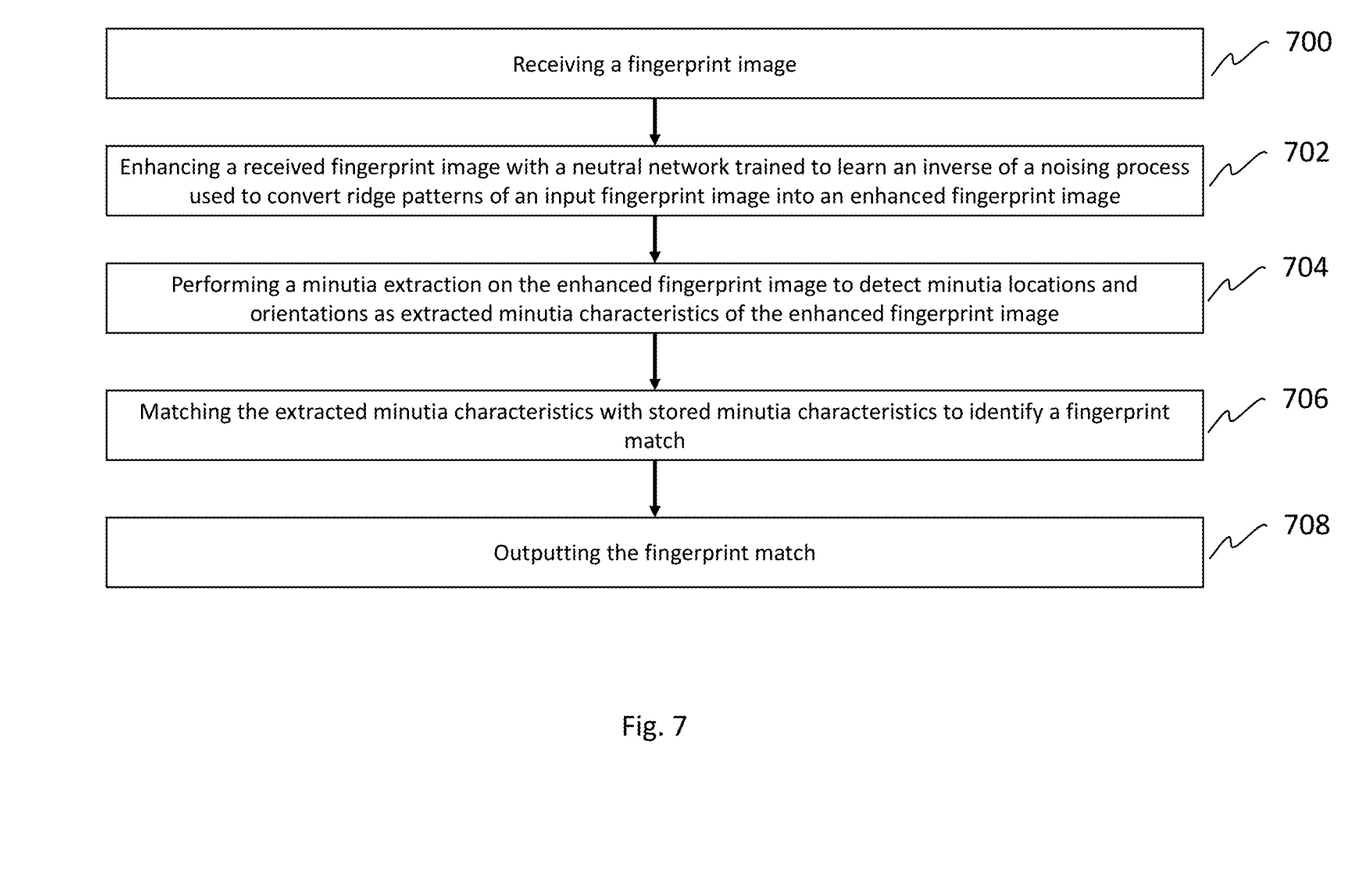
FIG. 7 is a flowchart illustrating a method for enhancing and matching a fingerprint in accordance with an exemplary embodiment of the present disclosure.

FIG. 7 is a flowchart illustrating a method for enhancing and matching a fingerprint in accordance with an exemplary embodiment of the present disclosure.

As shown in FIG. 7, the method involves receiving, in the controller 102, one or more fingerprint images (Step 700). The controller 102 executes a fingerprint enhancement module 502 encoded in the processing device 104 for enhancing the received fingerprint image with a neutral network trained to learn an inverse of a noising process used to convert ridge patterns of an input fingerprint image into an enhanced fingerprint image (Step 702). The controller 102 next executes a fingerprint minutiae module 504 encoded in the processing device 104 for performing a minutia extraction on the enhanced fingerprint image to detect minutia locations and orientations as extracted minutia characteristics of the enhanced fingerprint image (Step 704). The controller 102 executes a fingerprint matching module 506 encoded in the processing device 104 for matching the extracted minutia characteristics with stored minutia characteristics to identify a fingerprint match (Step 706). The controller 102 is configured for outputting the fingerprint match to one or more remote, peripheral, or external devices via one or more of the communications interface 108, the display interface 116, and the I/O interface 120, where applicable (Step 708).

Images can be enhanced before processing by existing minutiae extractors and matchers to achieve real-world adoption. Adoption by law enforcement will be preceded by FBI certification and guidance, court admissibility, extended validation, and a host of other similar issues. By exploiting accepted technologies for an exemplary embodiment, and adding a pre-processing of the presently disclosed NFE, the risk and effort for law enforcement agencies to test and adopt the disclosed technique can be minimized. It can be used concurrently with any existing law enforcement methods to do continuous testing and, can simply sit in front of already trusted tools. If a failure case occurs, users can simply re-process the fingerprint without the NFE to see if their original tooling would have succeeded.

Exemplary embodiments of the present disclosure address an overfitting problem by using synthetic data and train in a supervised fashion to directly learn a denoising goal to improve performance on new data.

Exemplary embodiments measure performance with respect to a goal of accurate matching, and explicitly remove as much as possible domain knowledge and hand-coded image processing.

In accordance with exemplary embodiments, neural networks are used to add value to the fingerprint matching process by exploiting a deep understanding and modeling of fingerprint images.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, one or more of the disclosed modules can be a hardware processor device with an associated memory.

Various embodiments of the present disclosure are described in terms of an exemplary computing device. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Data stored in the exemplary computing device (e.g., in the memory or associated database) may be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The exemplary computing device may also include a communications interface. The communications interface may be configured to allow software and data to be transferred between the computing device and external devices. Exemplary communications interfaces may include a modem, a network interface (e.g., an Ethernet card), a communications port, a PCMCIA slot and card, etc. Software and data transferred via the communications interface may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a phone line, a cellular phone link, a radio frequency link, etc.

Where the present disclosure is implemented using software, the software may be stored in a computer program product or non-transitory computer readable medium and loaded into the computing device using a removable storage drive or communications interface.

According to exemplary embodiments described herein, the trained neural network starts with four sets of convolutions, each followed by the use of batch-normalization. Such convolution can, for example, be implemented as described by S. Ioffe and C. Szegedy, Batch Normalization: Accelerating Deep Network Training by Reducing Internal Covariate Shift. Proceedings of The 32nd International Conference on Machine Learning, volume 37, pages 448-456, 2015 [9], the contents of which are hereby incorporated by reference in their entirety.

The Rectified Linear Unit (ReLU) non-linearity disclosed in FIG. 2 can, for example, be implemented by adapting known techniques disclosed, for example, by V. Nair and G. E. Hinton, Rectified Linear Units Improve Restricted Boltzmann Machines. Proceedings of the $27^{th}$ International Conference on Machine Learning: 807-814, 2010 [18], the contents of which are hereby incorporated by reference in their entirety, and then applying max-pooling. Each set of convolutions, can be split between the use of standard and dilated convolutions. See, for example, F. Yu and V. Koltun. Multi-Scale Context Aggregation by Dilated Convolutions. In International Conference on Learning Representations, 2016 [37], the contents of which are hereby incorporated by reference in their entirety.

According to exemplary embodiments of the present disclosure, deconvolution can be performed according to techniques disclosed by M. D. Zeiler, D. Krishnan, G. W. Taylor, and R. Fergus, Deconvolutional networks, Computer Vision and Pattern Recognition (CVPR), 2010 IEEE Conference on, pages 2528-2535, IEEE, 2010 [38] the contents of which are hereby incorporated by reference in their entirety, or other suitable techniques, can then be applied several times to get to the correct output (i.e., desired) size.

As already discussed, an exemplary embodiment can use generated synthetic data using SFinGe as disclosed by R. Cappelli, D. Maio, A. Lumini, and D. Maltoni, Fingerprint image reconstruction from standard templates, Pattern Analysis and Machine Intelligence, IEEE Transactions on, 29(9):1489-1503, 2007 [3] Synthetic Fingerprint Generator (SFinGe) version 4.1 the contents of which are hereby incorporated by reference in their entirety, or other suitable synthetic data as training data. The SFinGe software allows the user to specify a number of parameters regarding the generation process, to save with ground-truth images, including parameter meta data such as the locations where fingerprint ridges start and end.

The exemplary neural fingerprint enhancer as disclosed herein can see performance improve with the use of any of the tooling. As such, three tools that are publicly available can be used in an exemplary embodiment.

A target market of interest is the developers of fingerprint recognition and verification software, whom would want to integrate the disclosed technique into their products to improve accuracy and effectiveness. This would enable better support for those having a significant desire for improving matching accuracy and reducing false positives and negatives, such as the FBI, and similar governmental agencies. Of secondary interest would be the developers of software used by fingerprint examiners to manually label fingerprint minutia locations, whom may find this technology an aid in determining minutia locations.

Exemplary embodiments provide a way to increase the accuracy and efficiency of fingerprint verification systems using machine learning, while retaining the use of all previously verified and validated matching technology. Users can independently verify veracity by applying their existing tools both with and without fingerprint enhancement. This is possible because the system is intrinsically compatible with all existing enrollment and processing techniques. Being able to use existing approaches on top of the neural fingerprint enhancement allows for faster validation and building of trust, in a system which requires such validation in order to use the technology for the critical applications of law enforcement in finding and prosecuting criminals, where false negatives and positives have important life altering consequences.

By using synthetic training data, exemplary embodiments demonstrate that it is possible to teach a fingerprint enhancement pre-processor without the complex pre-processing steps that have been used in prior methods. The disclosed neural network fingerprint matching enhancer improves the AUC for multiple different minutiae extraction/matching algorithms on real fingerprints, and testing on additional generated fingerprint datasets shows that NFE can significantly improve results on the hardest fingerprint images. Exemplary neural networks can simplify fingerprint processing systems.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

REFERENCES

The references and their contents of which are hereby incorporated by reference herein in their entireties, are as follows:

[1] A. Benavoli, G. Corani, and F. Mangili. Should We Really Use Post-Hoc Tests Based on Mean-Ranks? Journal of Machine Learning Research, 17(5):1-10, 2016.
[2] R. Cappelli. SFinGe. In Encyclopedia of Biometrics, pages 1-9. Springer US, Boston, Mass., 2014.
[3] R. Cappelli, D. Maio, A. Lumini, and D. Maltoni. Fingerprint image reconstruction from standard templates. Pattern Analysis and Machine Intelligence, IEEE Transactions on, 29(9):1489-1503, 2007.
[4] R. Cappelli. Synthetic fingerprint generation. Handbook of Fingerprint Recognition: 203-232, 2003.
[5] S. Chikkerur, A. N. Cartwright, and V. Govindaraju. Fingerprint enhancement using STFT analysis. Pattern Recognition, 40(1):198-211, January 2007. ISSN: 0031-3203.
[6] L. N. Darlow and B. Rosman. Fingerprint minutiae extraction using deep learning. In 2017 IEEE International Joint Conference on Biometrics (IJCB), pages 22-30. IEEE, October 2017. ISBN: 978-1-5386-1124-1.
[7] J. Demšar. Statistical Comparisons of Classifiers over Multiple Data Sets. Journal of Machine Learning Research, 7:1-30, December 2006. ISSN: 1532-4435.
[8] FingerJetFX OSE, 2011. URL: https://github.com/FingerJetFXOSE/FingerJetFXOSE.
[9] S. Ioffe and C. Szegedy. Batch Normalization: Accelerating Deep Network Training by Reducing Internal Covariate Shift. In Proceedings of The 32nd International Conference on Machine Learning, volume 37, pages 448-456, 2015.
[10] ISO/IEC 19794-2:2011. Technical report, International Organization for Standardization, 2011, page 93.
[11] A. Jain, L. Hong, and R. Bolle. On-line fingerprint verification. IEEE transactions on pattern analysis and machine intelligence, 19(4):302-314, 1997.
[12] D. Lin, S. Talathi, and S. Annapureddy. Fixed Point Quantization of Deep Convolutional Networks. In M. F. Balcan and K. Q. Weinberger, editors, Proceedings of The 33rd International Conference on Machine Learning, volume 48 of Proceedings of Machine Learning Research, pages 2849-2858, New York, N.Y., USA. PMLR, 2016.

[13] Lu Jiang, Tong Zhao, Chaochao Bai, A. Yong, and Min Wu. A direct fingerprint minutiae extraction approach based on convolutional neural networks. In 2016 International Joint Conference on Neural Networks (IJCNN), pages 571-578. IEEE, July 2016. ISBN: 978-1-5090-0620-5.

[14] D. Maio, D. Maltoni, R. Cappelli, J. Wayman, and A. Jain. FVC2000: fingerprint verification competition. IEEE Transactions on Pattern Analysis and Machine Intelligence, 24(3):402-412, March 2002. ISSN: 01628828.

[15] D. Maio, D. Maltoni, R. Cappelli, J. L. Wayman, and A. K. Jain. FVC2002: Second Fingerprint Verification Competition. Proceedings of the 16th International Conference on Pattern Recognition (ICPR'02) Volume 3-Volume 3. ICPR '02, 24(3):402-412, 2002.

[16] D. Maio, D. Maltoni, R. Cappelli, J. L. Wayman, and A. K. Jain. FVC2004: Third fingerprint verification competition. In Biometric Authentication, pages 1-7. Springer Berlin Heidelberg, 2004.

[17] D. Molchanov, A. Ashukha, and D. Vetrov. Variational Dropout Sparsifies Deep Neural Networks. In International Conference on Machine Learning (ICML), 2017.

[18] V. Nair and G. E. Hinton. Rectified Linear Units Improve Restricted Boltzmann Machines. Proceedings of the 27th International Conference on Machine Learning: 807-814, 2010.

[19] D. L. Nguyen, K. Cao, and A. K. Jain. Robust Minutiae Extractor: Integrating Deep Networks and Fingerprint Domain Knowledge. In The 11th International Conference on Biometrics, 2018, 2018.

[20] R. F. Nogueira, R. D. A. Lotufo, and R. C. Machado. Evaluating software-based fingerprint liveness detection using Convolutional Networks and Local Binary Patterns. In Proceedings of the IEEE Workshop on Biometric Measurements and Systems for Security and Medical Applications (BIOMS), pages 22-29, Rome, Italy, 2014. ISBN: 9781479951765.

[21] M. A. Olsen, E. Tabassi, A. Makarov, and C. Busch. Self-Organizing Maps for Fingerprint Image Quality Assessment. 2013 IEEE Conference on Computer Vision and Pattern Recognition Workshops: 138-145, 2013. ISSN: 21607508.

[22] D. Peralta, M. Galar, I. Triguero, D. Paternain, S. Garcia, E. Barrenechea, J. M. Benitez, H. Bustince, and F. Herrera. A survey on fingerprint minutiae based local matching for verification and identification: Taxonomy and experimental evaluation. Information Sciences, 315: 67-87, September 2015. ISSN: 0020-0255.

[23] N. K. Ratha, S. Chen, and A. K. Jain. Adaptive flow orientation-based feature extraction in fingerprint images. Pattern Recognition, 28(11):1657-1672, November 1995. ISSN: 00313203.

[24] N. Ratha, K. Karu, Shaoyun Chen, and A. Jain. A realtime matching system for large fingerprint databases. IEEE Transactions on Pattern Analysis and Machine Intelligence, 18(8):799-813, 1996. ISSN: 01628828.

[25] A. Ross, A. Jain, and J. Reisman. A hybrid fingerprint matcher. Pattern Recognition, 36(7):1661-1673, 2003. ISSN: 00313203.

[26] M. Sahasrabudhe and A. M. Namboodiri. Fingerprint Enhancement Using Unsupervised Hierarchical Feature Learning. In Proceedings of the 2014 Indian Conference on Computer Vision Graphics and Image Processing, ICVGIP '14, 2:1-2:8, New York, N.Y., USA. ACM, 2014. ISBN: 978-1-4503-3061-9.

[27] S. N. Sarbadhikari, J. Basak, S. K. Pal, and M. K. Kundu. Noisy fingerprints classification with directional FFT based features using MLP. Neural Computing & Applications, 7(2):180-191, 1998. ISSN: 0941-0643.

[28] A. Shrivastava, T. Pfister, O. Tuzel, J. Susskind, W. Wang, and R. Webb. Learning from Simulated and Unsupervised Images through Adversarial Training. In 2017 IEEE Conference on Computer Vision and Pattern Recognition (CVPR), pages 2242-2251. IEEE, July 2017. ISBN: 978-1-5386-0457-1.

[29] K. Sundararajan and D. L. Woodard. Deep Learning for Biometrics: A Survey. ACM Comput. Surv., 51(3):65:1-65:34, May 2018. ISSN: 0360-0300.

[30] E. Tabassi. Development of NFIQ 2.0. Technical report, National Institute of Standards and Technology, 2012.

[31] J. Tompson, K. Schlachter, P. Sprechmann, and K. Perlin. Accelerating Eulerian Fluid Simulation With Convolutional Networks. In D. Precup and Y. W. Teh, editors, Proceedings of the 34th International Conference on Machine Learning, volume 70 of Proceedings of Machine Learning Research, pages 3424-3433, International Convention Centre, Sydney, Australia. PMLR, 2017.

[32] R. Važan. SourceAFIS, 2018. URL: https://sourceafis.machinezoo.com/.

[33] C. Wang, K. Li, Z. Wu, and Q. Zhao. A DCNN Based Fingerprint Liveness Detection Algorithm with Voting Strategy. In J. Yang, J. Yang, Z. Sun, S. Shan, W. Zheng, and J. Feng, editors, Biometric Recognition, pages 241-249.2015. ISBN: 978-3-319-25417-3.

[34] C. I. Watson, M. D. Garris, E. Tabassi, C. L. Wilson, R. M. McCabe, S. Janet, and K. Ki. User's Guide to NIST Biometric Image Software (NBIS). Technical report, National Institute of Standards and Technology, 2007.

[35] F. Wilcoxon. Individual Comparisons by Ranking Methods. Biometrics Bulletin, 1(6):80, December 1945. ISSN: 00994987.

[36] L. Yong-xia, Q. Jin, and X. Rui. A new detection method of singular points of fingerprints based on neural network. In Computer Science and Information Technology (ICCSIT), 2010 3rd IEEE International Conference on, volume 1, pages 301-305, July 2010.

[37] F. Yu and V. Koltun. Multi-Scale Context Aggregation by Dilated Convolutions. In International Conference on Learning Representations, 2016.

[38] M. D. Zeiler, D. Krishnan, G. W. Taylor, and R. Fergus. Deconvolutional networks. In Computer Vision and Pattern Recognition (CVPR), 2010 IEEE Conference on, pages 2528-2535. IEEE, 2010.

What is claimed is:

1. A method of neural fingerprint enhancement for fingerprint recognition, the method comprising:
generating a plurality of synthetic fingerprint images using only computer-generated data;
compiling the plurality of synthetic fingerprint images into a dataset;
training a neural network using the dataset so that the neural network learns an inverse of a noising process used to convert ridge patterns of an input fingerprint image into an enhanced fingerprint image;
enhancing a received fingerprint image through the trained neural network;

performing a minutia extraction on the enhanced fingerprint image to detect minutia locations and orientations as extracted minutia characteristics of the enhanced fingerprint image;

matching the extracted minutia characteristics with stored minutia characteristics to identify a fingerprint match; and outputting the fingerprint match.

2. Method according to claim 1, wherein enhancing a received fingerprint image with a neural network further comprises:

subjecting the received fingerprint image to at least one sequence including the convolution, batch-normalization, a rectified linear unit (ReLU) non-linearity and max-pooling.

3. Method according to claim 2, wherein enhancing a received fingerprint image with a neural network further comprises:

subjecting the received fingerprint image to plural sequences of the convolution, batch-normalization, a rectified linear unit (ReLU) non-linearity and max-pooling.

4. Method according to claim 2, wherein the convolution comprises:

a standard convolution for local details; and a dilation for non-local details.

5. Method according to claim 3, wherein each convolution comprises:

a standard convolution for local details; and a dilation for non-local details.

6. Method according to claim 5, comprising:

applying a one-by-one convolution to an output of the plural convolutions to share information across convolution filters.

7. Method according to claim 6, comprising:

applying deconvolution to an output of the one-by-one convolution to scale the output.

8. Method according to claim 7, comprising:

applying sigmoid activation to clamp values to a normalized range.

9. A method according to claim 1, wherein the enhancing includes subjecting the received fingerprint image to at least a convolution which includes at least one standard convolution and at least one dilated convolution.

10. Method according to claim 1, wherein the computer-generated data is generated based on at least one user-defined parameter.

11. System of neural fingerprint enhancement for fingerprint recognition, the system comprising:

a fingerprint generation module that generates a plurality of synthetic fingerprint images using only computer-generated data;

a memory module that compiles the plurality of synthetic fingerprint images into a dataset;

a neural network module trained using the dataset;

a denoising convolutional auto-encoder module trained by the neural network module to learn an inverse of a noising process that converts ridge patterns of an input image fingerprint into an enhanced fingerprint image;

a minutia extraction module configured for detecting minutia locations and orientation as extracted minutia characteristics of an enhanced fingerprint image;

a fingerprint matching module for matching the extracted minutia characteristics with stored minutia characteristics to identify a fingerprint match; and an output module for outputting the fingerprint match.

12. System according to claim 11, wherein the auto-encoder module comprises:

the neural network module which executes at least one sequence of convolution, batch-normalization, a rectified linear unit (ReLU) non-linearity and max-pooling.

13. System according to claim 12, wherein the auto-encoding module comprises:

the neural network module which executes plural sequences of convolution, batch-normalization, a rectified linear unit (ReLU) non-linearity and max-pooling.

14. System according to claim 12, wherein the at least one sequence of convolution comprises:

a standard convolution for local details; and a dilation for non-local details.

15. System according to claim 13, wherein each convolution comprises:

a standard convolution for local details; and a dilation for non-local details.

16. System according to claim 14, comprising:

a one-by-one module convolution for processing an output of the plural convolutions to share information across convolution filters.

17. System according to claim 16, comprising:

a deconvolution module to process to an output of the one-by-one convolution to scale the output.

18. System according to claim 17, comprising:

a sigmoid activation module to clamp valves to a normalized range.

19. System according to claim 11, wherein the computer-generated data is generated based on at least one user-defined parameter.

* * * * *